Figures 1, 2:
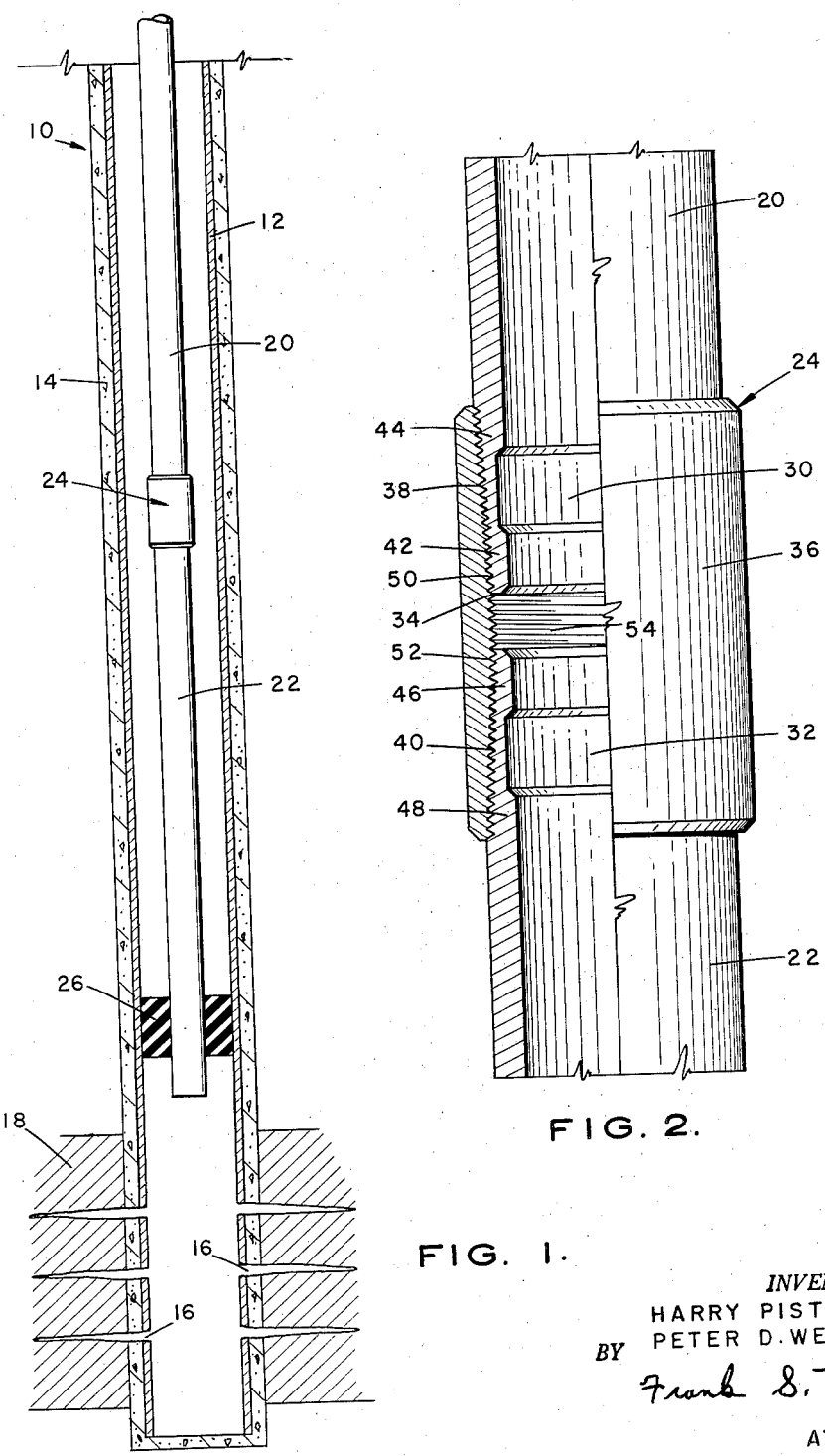

Aug. 13, 1963  H. PISTOLE ETAL  3,100,657
PIPE COUPLING HAVING HOLDING MEANS RESPONSIVE
TO HIGH INTERNAL FLUID PRESSURE
Filed Oct. 28, 1959

INVENTORS.
HARRY PISTOLE,
PETER D. WEINER,
BY
*Frank S. Troidl*
ATTORNEY.

United States Patent Office 3,100,657
Patented Aug. 13, 1963

3,100,657
PIPE COUPLING HAVING HOLDING MEANS RESPONSIVE TO HIGH INTERNAL FLUID PRESSURE
Harry Pistole, Houston, and Peter D. Weiner, College Station, Tex., assignors, by mesne assignments, to Jersey Production Research Company, Tulsa, Okla., a corporation of Delaware
Filed Oct. 28, 1959, Ser. No. 849,230
1 Claim. (Cl. 285—107)

This invention is a new and novel coupling arrangement for interconnecting tubular members subject to high internal pressure.

The invention to be described herein has particular utility as a coupling arrangement for tubing used in oil and gas well production.

In the past twenty years, the pressures encountered in oil and gas wells during production has continually increased. This increase has been so great that non-premium type tubing has become undependable. When non-premium type tubing connections are used, it has been found that when pressures are encountered exceeding 5000 p.s.i., leakage frequently occurs. This invention provides a coupling which alleviates the leakage problem.

The invention will be further understood by reference to the following detailed description and drawings in which:

FIG. 1 is a schematic elevational view showing tubing arranged in a producing well; and FIG. 2 is an enlarged detailed view of the coupling arrangement.

Referring to FIG. 1, a producing well 10 is shown drilled in the earth's surface. The usual casing 12 is cemented to the sides of the well 10 by cement 14.

Perforations 16 have been made through the casing 12 and cement 14. The perforations 16 extend into the oil and gas producing formation 18.

A production tubing including a first tubular member 20 and a second tubular member 22 extends from the earth's surface to a point just above the producing formation 18. The tubular members 20 and 22 are interconnected by a coupling indicated generally by the numeral 24.

A packer 26 is located above the producing formation 18 and about the outside diameter of the production tubular member 22. Packer 26 isolates the pressure so as to cause the oil and gas from producing formation 18 to flow up the production tubing to the earth's surface where it is collected.

The detailed structure of the coupling arrangement constituting our invention is shown in FIG. 2. With conventional pipe coupling, which does not have the circular grooves 30 and 32 formed in the tubular members 20 and 22, respectively, the greater inside pressures caused by the oil and gas production causes a seal at the point indicated by numeral 34. This greater inside pressure causes the outer cylindrical coupling 36 to bow outwardly from the axis of the tubular members. The resulting tension causes the tubular members 20 and 22 to bow inwardly at points 38 and 40, respectively. Hence, the coupling 36 and the tubular members 20 and 22 tend to separate at points 38 and 40, causing leaks at the coupling. As formerly stated, this leaking occurs at pressures exceeding 5000 p.s.i.

This invention provides a better seal than can be obtained by the non-premium type tubing connections. By providing the circular grooves 30 and 32, the inside diameter of the pipes 20 and 22 are increased at the points 38 and 40. This causes a greater pressure between the cylindrical member 36 and the tubular members at points 38 and 40 than on the adjacent sides. The inside pressure thus tends to deform the pipes or tubular members at the circular grooves, thus bowing the tubular members at these points outwardly so as to maintain a seal at the points 38 and 40.

It is necessary that circular grooves 30 and 32 be spaced inwardly from the extremities of the tubular members 20 and 22. Thus, greater thickness is obtained on each side of the circular grooves 30 and 32 as at 42 and 44, and 46 and 48, respectively.

The portions adjacent the extremities of tubular members 20 and 22 are screw threaded at 50 and 52, respectively, to receive mating screw threads 54 formed on the inside diameter of the cylindrical member 36. The cylindrical member 36 is made sufficiently long to extend over both the circular groove 30 and the circular groove 32. This length is necessary in order to provide the proper seal at the points 38 and 40.

This new high pressure coupling for use in high pressure oil and gas wells is simple in construction and withstands very high pressures very effectively. The coupling has been tested at pressures ranging from 8000 p.s.i. to 10,000 p.s.i. with no leakage, or breakage occurring.

As an example of dimensions used in the new coupling with a tubing having an inside diameter of 2", a groove having a depth of ⅛" and a length of 1⅛" and beginning at ½" from the extremity of the tubular members was found effective.

We claim:

For use in tubing to be placed in a borehole and subjected to high internal pressure; a pair of spaced apart tubular members coaxially arranged in tandem, each tubular member being provided with external threads adjacent its extremity and having an internal circular groove formed therein spaced from the extremity facing the other tubular member to provide a portion of reduced thickness, said internal circular grooves having been formed without any corresponding increases in the external diameters of the tubular members, said circular grooves having a greater length than depth, and spaced the proper distance from the extremity facing the other tubular member to provide portions of greater thickness on both sides of said portion of reduced thickness, and a one-piece cylindrical outside coupling joining the tubular members and being sufficiently long to encompass both circular grooves, said one-piece cylindrical outside coupling tending to bow outwardly when subjected to high internal pressure, and said grooves in said spaced apart tubular members having length-to-depth ratios such that the portions of greater thickness remain relatively rigid and the portion of reduced thickness bows outwardly when the cylindrical outside coupling bows outwardly so that the tubular members maintain a tight seal with the cylindrical outside coupling.

References Cited in the file of this patent
UNITED STATES PATENTS

| | | |
|---|---|---|
| 283,972 | Converse | Aug. 28, 1883 |
| 310,264 | Emery | Jan. 6, 1885 |
| 332,184 | Bole | Dec. 8, 1885 |
| 1,302,978 | Drewry | May 6, 1919 |
| 1,483,499 | Allee | Feb. 12, 1924 |
| 1,859,065 | Anderson | May 17, 1932 |
| 2,239,942 | Stone | Apr. 29, 1941 |
| 2,574,081 | Abegg | Nov. 6, 1951 |
| 2,772,102 | Webb | Nov. 27, 1956 |
| 2,907,589 | Knox | Oct. 6, 1959 |